(12) United States Patent
Manthiramoorthy

(10) Patent No.: US 9,661,614 B2
(45) Date of Patent: May 23, 2017

(54) DETERMINING TRANSMISSION PARAMETERS FOR TRANSMITTING BEACON FRAMES

(71) Applicant: Aruba Networks, Inc., Sunnyvale, CA (US)

(72) Inventor: Natarajan Manthiramoorthy, Fremont, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/478,053

(22) Filed: Sep. 5, 2014

(65) Prior Publication Data

US 2014/0369248 A1    Dec. 18, 2014

Related U.S. Application Data

(63) Continuation of application No. 13/652,282, filed on Oct. 15, 2012.

(51) Int. Cl.
| | | |
|---|---|---|
| *H04W 72/04* | (2009.01) | |
| *H04W 28/18* | (2009.01) | |
| *H04W 48/10* | (2009.01) | |
| *H04W 52/02* | (2009.01) | |
| *H04W 52/32* | (2009.01) | |
| *H04W 72/00* | (2009.01) | |
| *H04W 4/00* | (2009.01) | |
| *H04W 52/14* | (2009.01) | |
| *H04W 52/28* | (2009.01) | |

(52) U.S. Cl.
CPC ....... *H04W 72/0406* (2013.01); *H04W 4/008* (2013.01); *H04W 28/18* (2013.01); *H04W 48/10* (2013.01); *H04W 52/0219* (2013.01); *H04W 52/143* (2013.01); *H04W 52/146* (2013.01); *H04W 52/283* (2013.01); *H04W 52/32* (2013.01); *H04W 52/322* (2013.01); *H04W 72/005* (2013.01); *H04W 72/0453* (2013.01)

(58) Field of Classification Search
CPC ..... H04W 84/12; H04W 88/06; H04W 24/00; H04W 8/005; H04W 88/08; H04W 64/00; H04W 28/18; H04W 88/10
USPC ............... 370/338, 328, 329, 252, 254, 341; 455/450, 509
See application file for complete search history.

(56) References Cited

U.S. PATENT DOCUMENTS

| | | |
|---|---|---|
| 8,526,346 B1 | 9/2013 | Liu |
| 8,675,717 B1 | 3/2014 | Yuan et al. |
| 2002/0054568 A1 | 5/2002 | Hoogenboom et al. |
| 2004/0003069 A1 | 1/2004 | Wong |
| 2004/0117497 A1* | 6/2004 | Park ............................. 709/230 |
| 2004/0148374 A1 | 7/2004 | Bush et al. |

(Continued)

OTHER PUBLICATIONS

Manthiramoorthy, N.,; "Non-Final Office Action cited in U.S. Appl. No. 14/478,071" mailed Dec. 6, 2016; 16 pages.

*Primary Examiner* — Charles C Jiang
*Assistant Examiner* — Oussama Roudani
(74) *Attorney, Agent, or Firm* — Brooks, Cameron & Huebsch, PLLC

(57) ABSTRACT

A method includes dynamically determining transmission parameters for transmission of beacon frames corresponding to a Wireless Local Area Network (WLAN) supported by an access point. The transmission parameters being based on zero or more client devices connected to the WLAN or monitored data indicative of a load at the access point.

21 Claims, 3 Drawing Sheets

(56) References Cited

U.S. PATENT DOCUMENTS

| | | |
|---|---|---|
| 2004/0165545 A1 | 8/2004 | Cook |
| 2005/0073952 A1 | 4/2005 | Champlin et al. |
| 2006/0195603 A1 | 8/2006 | Seungdong Lee |
| 2007/0201413 A1* | 8/2007 | Laine .................. H04L 12/189 370/338 |
| 2009/0011713 A1* | 1/2009 | Abusubaih ............. G01S 11/02 455/67.11 |
| 2009/0040954 A1* | 2/2009 | Usuba ......................... 370/311 |
| 2009/0055831 A1 | 2/2009 | Bauman et al. |
| 2010/0135238 A1* | 6/2010 | Sadri et al. .................. 370/329 |
| 2011/0003598 A1* | 1/2011 | Ma .................... H04W 72/0426 455/452.1 |
| 2011/0013608 A1 | 1/2011 | Lee et al. |
| 2011/0292792 A1 | 12/2011 | Zuo et al. |
| 2012/0023217 A1 | 1/2012 | Wakumoto |
| 2012/0046026 A1 | 2/2012 | Chande et al. |
| 2012/0182965 A1* | 7/2012 | Das et al. ..................... 370/331 |
| 2012/0307702 A1* | 12/2012 | Nakae et al. ................. 370/311 |
| 2013/0223221 A1 | 8/2013 | Xu et al. |
| 2014/0105037 A1 | 4/2014 | Manthiramoorthy |

\* cited by examiner

DETERMINING TRANSMISSION PARAMETERS FOR TRANSMITTING BEACON FRAMES

TECHNICAL FIELD

The present disclosure relates to configuring access points. In particular, the present disclosure relates to dynamically selecting values for transmission parameters used by access points for transmitting beacon frames.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is a dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include but is not limited to a Wireless Access Point (WAP) that communicates wirelessly with devices using Wi-Fi, Bluetooth or related standards and that communicates with a wired network.

Access points transmit management frames and data frames to client devices, other access points, and/or any other type of device in a network. Management frames in IEEE 802.11 based WLANs include beacon frames which include information about a network. In one example, a beacon frame is conventionally broadcasted by an access point at a fixed frequency and fixed data transmission rate to announce the presence of one or more WLANs for client devices to find the one or more WLANs. In another example, a beacon frame is transmitted by an access point to announce information related to frames buffered at the access point.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
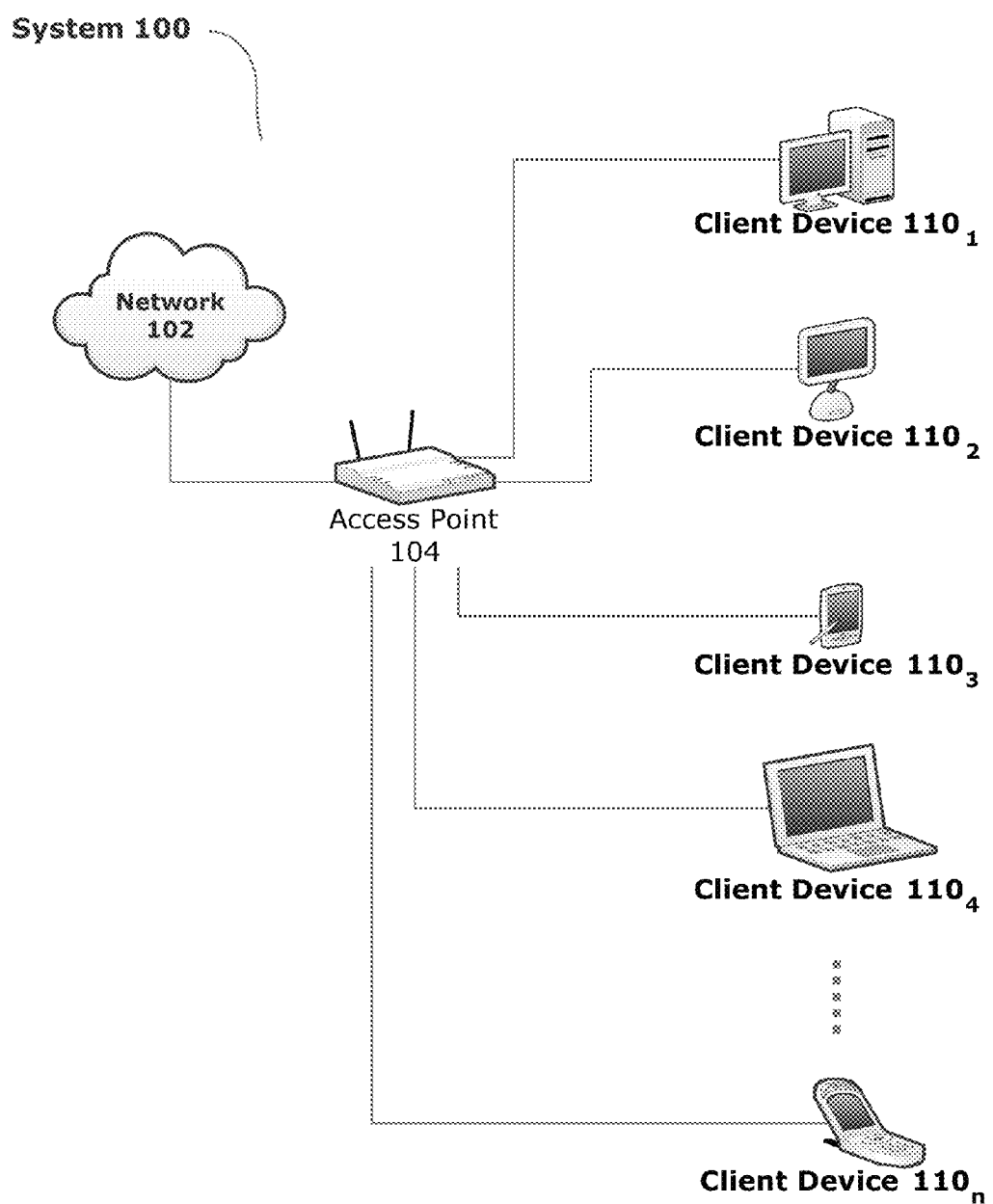
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

TABLE OF CONTENTS:
1. GENERAL OVERVIEW
2. ARCHITECTURAL OVERVIEW
3. TRANSMISSION OF BEACON FRAMES
4. DETERMINING TRANSMISSION PARAMETERS FOR TRANSMISSION OF BEACON FRAMES
5. EXAMPLES OF DETERMINING A BEACON INTERVAL FOR TRANSMITTING BEACON FRAMES
6. EXAMPLES OF DETERMINING A DATA TRANSMISSION RATE FOR TRANSMITTING BEACON FRAMES
7. EXTENSIONS AND MISCELLANEOUS

1. GENERAL OVERVIEW

In one or more embodiments, one or more transmission parameters used by access points for transmitting beacon frames are dynamically determined Examples of transmission parameters for use in transmitting a beacon frame include a beacon interval which represents an amount of time between beacon frame transmissions and a data transmission rate (amount of data per period of time) at which the beacon frame is transmitted. A transmission frequency (for example, a number of beacons per period of time) may be used instead of a beacon interval.

In an embodiment, transmission parameters for transmitting beacon frames by an access point are determined dynamically based on information corresponding to the client devices currently connected to the access point.

In an embodiment, transmission parameters for transmitting beacon frames by an access point are determined dynamically based on information corresponding to the client devices expected to be connected to a WLAN supported by the access point. Historical connectivity data for an access point may be used to determine which client devices are expected to be connected to a WLAN supported by the access point. In an embodiment, a user's schedule may be used to predict that the user's client device will be at a particular location (for example, a conference room) and will connect to a particular WLAN supported by an access point at the particular location.

In an embodiment, transmission parameters for transmitting beacon frames by an access point are determined dynamically based on an amount of data buffered at the access point or an amount of data traffic propagating through the access point. In an example, if a percentage of buffer capacity, for an access point buffer storing client data, exceeds a threshold percentage value, then the beacon interval is reduced to increase the frequency with which client devices are notified of buffered frames stored at the access point. In another example, if a percentage of buffer capacity, for an access point buffer storing client data, exceeds a threshold percentage value, then the beacon interval is increased to allocate more channel time to transmit data frames and less channel time to transmit beacon frames.

2. ARCHITECHTURAL OVERVIEW

FIG. 1 shows a block diagram example of a system in accordance with one or more embodiments. System 100, as illustrated in FIG. 1, is a digital system that includes a network 102 (for example, a Local Area Network, a Wide Area Network, the Internet, Intranet, etc.), an access point 104, and a set of client devices $110_1$-$110_n$. The client devices may include any set of devices that communicate wirelessly with access point 104 to gain access to a network resource (for example, network resources available via Network 102). In one or more embodiments, System 100 may include more or less devices, than the devices illustrated in FIG. 1, that may be connected to other devices within System 100 via wired and/or wireless segments. In an example, System 100 may include a controller (not shown) which is configured to communicate with one or more access points (for example, access point 104) within System 100. The controller may link access point 104 to network 102.

The access point 104 is communicatively coupled to the network 102 via a transmission medium to send and receive data. The transmission medium may be a wired or a wireless connection. Although access point 104 is illustrated in FIG. 1, embodiments are applicable to any network device which transmits beacon frames in accordance with IEEE 802.11 standards.

In an embodiment, the access point 104 communicatively couples client devices $110_1$-$110_n$ to the network 102 or other client devices by forwarding data to or from the client devices $110_1$-$110_n$. The access point 104 connects to client devices $110_1$-$110_n$ via one or more WLANs corresponding to access point 104. At any given time, a number of client devices connected to a WLAN supported by access point 104 may vary from zero to n (where n is a positive integer).

In an embodiment, the client devices $110_1$-$110_n$ are digital devices that include a processor, memory hierarchy, and input/output (I/O) interfaces including a wireless interface such as an IEEE 802.11 wireless interface. The wireless interface may be used to communicate with the access point 104. Examples of client devices $110_1$-$110_n$ include wireless electronic devices such as personal computers, laptop computers, netbook computers, wireless music players, portable telephone communications devices, smart phones, tablets, and digital televisions.

Figure 2:
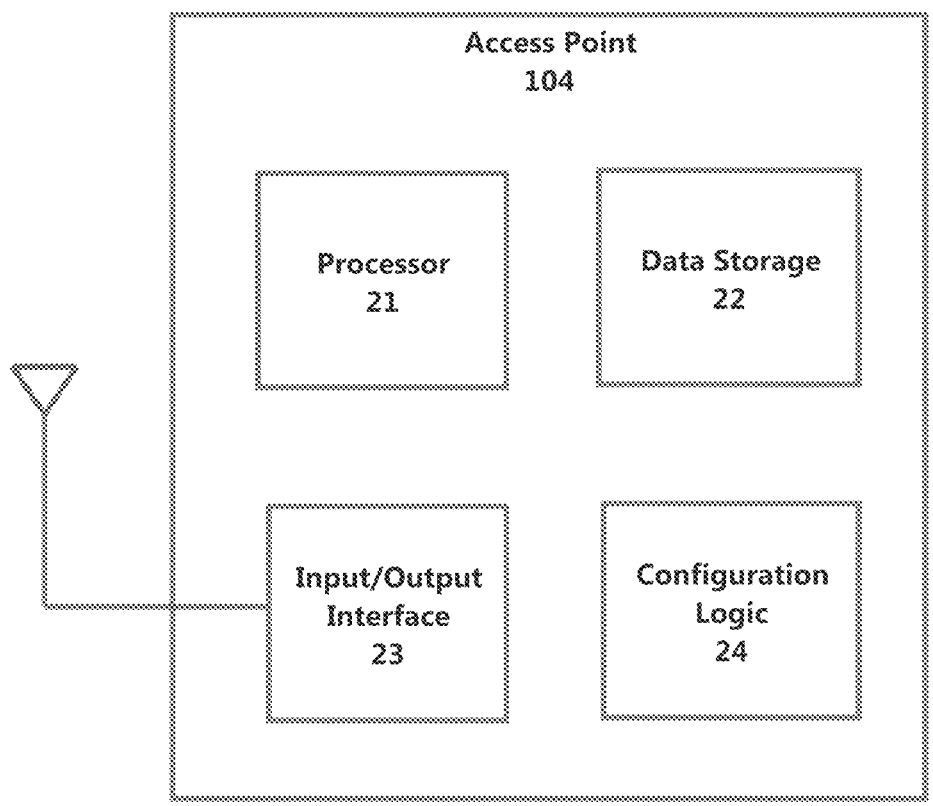
FIG. 2 shows a block diagram example of an access point in accordance with one or more embodiments.

FIG. 2 shows a block diagram example of access point 104 in accordance with one or more embodiments. The access point 104 is a network device that comprises one or more of: a processor 21, data storage 22, an I/O interface 23, and a device configuration unit 24. Other access points within System 100 may be configured similarly or differently than access point 104.

The data storage 22 of the access point 104 may include a read-write memory for storing programs and data during the access point 104's operations, The read-write memory may include, but is not limited or restricted to volatile memory (e.g. random access memory "RAM") or non-volatile memory (e.g. read only memory "ROM", electrical programmable read only memory "EPROM", battery-backed RAM, Flash, etc.) for storing instructions and data needed for the startup and/or operations of access point 104. The data storage 22 stores data that is to be transmitted from the access point 104 or data that is received by access point 104. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 Wi-Fi interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, an access point may refer to any device which functions as a hot spot by providing access to one or more network resources to one or more client devices. In an example, a cellular phone may function as a hot spot by providing connecting a laptop to a WLAN. In another example, an access point may refer to a "hotspot" device sold by cellular carriers that connect to client devices over Wi-Fi and connect to a network resources over a cellular network.

In an embodiment, the device configuration unit 24 includes one or more functional units implemented using firmware, hardware, software, or a combination thereof for determining transmission parameters for transmitting beacon frames associated with one or more WLANs supported by an access point. One or more physical or functional components of the device configuration unit 24 may be implemented on access point 104 or on a separate device in communication with access point 104.

Although, the device configuration unit 24 is shown as implemented on access point 104, one or more physical or functional components of the device configuration unit 24 may be implemented on a separate device. The operations that may be performed by the device configuration unit 24 (or by other functional units) for determining transmission parameters for transmitting beacon frames are described below with reference to FIG. 3.

3. TRANSMISSION OF BEACON FRAMES

In an embodiment, beacon frames are transmitted by a device such as an access point to provide information to other devices. As described above, beacon frames may be broadcasted or advertised for announcing the presence of one or more WLANs, to announce information related to buffered frames, or for any other suitable purpose. Beacon frames may be used in accordance with IEEE 802.11 standard for establishing and/or maintaining communications between different wireless devices such as access points and client devices. In an embodiment, a beacon frame includes one or more of a beacon interval, a timestamp, a Basic Service Set Identifier (BSSID), supported data transmission rates for a local area network, Enhanced Distributed Channel access (EDCA) parameters, client device requirements (for example, security), and a Traffic Indication Map (TIM) related to data buffered at an access point.

In one or more embodiments, beacon frames are transmitted by access points based on one or more transmission parameters that are dynamically configured. The transmission parameters may include, but are not limited to:

a. Beacon Interval—In an embodiment, a beacon interval refers to an amount of time between transmissions of beacon frames associated with the same WLAN identified by a BSSID. The current value of a beacon interval may be transmitted within a beacon frame to a client device. Based on a received beacon interval, a client device may determine when to wake up from a power save mode for receiving the next beacon frame. In an embodiment, a special value for a beacon interval may be used to signal that beacon frame transmissions are to be suspended. For example, a letter value or a negative integer value for a beacon interval data field may be used to indicate that no beacon frames are to be transmitted. A frequency (number of beacon frames per period of time) may be used as an alternate or in addition to a beacon interval.

b. Data Transmission Rate—In an embodiment, a data transmission rate refers to an amount of data transmitted per period of time. In an example, a data transmission rate is measured in Megabits per second (Mbps). Different data transmission rates may be used for transmitting data frames and management frames (for example, beacon frames). Example values of data transmission rates, which should not be construed as limiting the scope of any of the embodiments, include 1 Mbps, 2 Mbps, 5.5 Mbps, 12 Mbps, and 24 Mbps. As would be appreciated by a person skilled in the art, the data transmission rate used for transmitting data is inversely proportional to an amount of time needed for transmitting that data. Accordingly, the higher the data transmission rate is for sending a beacon frame, the lower the amount of time is necessary for transmitting the beacon frame. Client devices may be configured or capable of receiving data at certain preferred or maximum data transmission rates; data transmitted to client devices at data transmission rates higher than the preferred or maximum data transmission rates for that client devices may result in an increase in dropped data packets.

c. Transmit Power—In an embodiment, a transmit power for transmitting a beacon frame may be based on information associated with connected client devices. For example, if all connected client devices are physical close to an access point, a low transmit power may be selected for transmitting beacon frames. Alternatively, if at least one connected device is physically distant from an access point, a high transmit power may be selected for transmitting beacon frames.

In an embodiment, transmission parameters for transmitting beacon frames advertising a first WLAN supported by an access point are different than transmission parameters for transmitting beacon frames advertising a second WLAN supported by the same access point. As described below, transmission parameters for transmitting beacon frames related to a particular WLAN may be based on information associated with the zero or more client devices connected to that particular WLAN.

4. DETERMINING TRANSMISSION PARAMETERS FOR TRANSMITTING BEACON FRAMES

Figure 3:
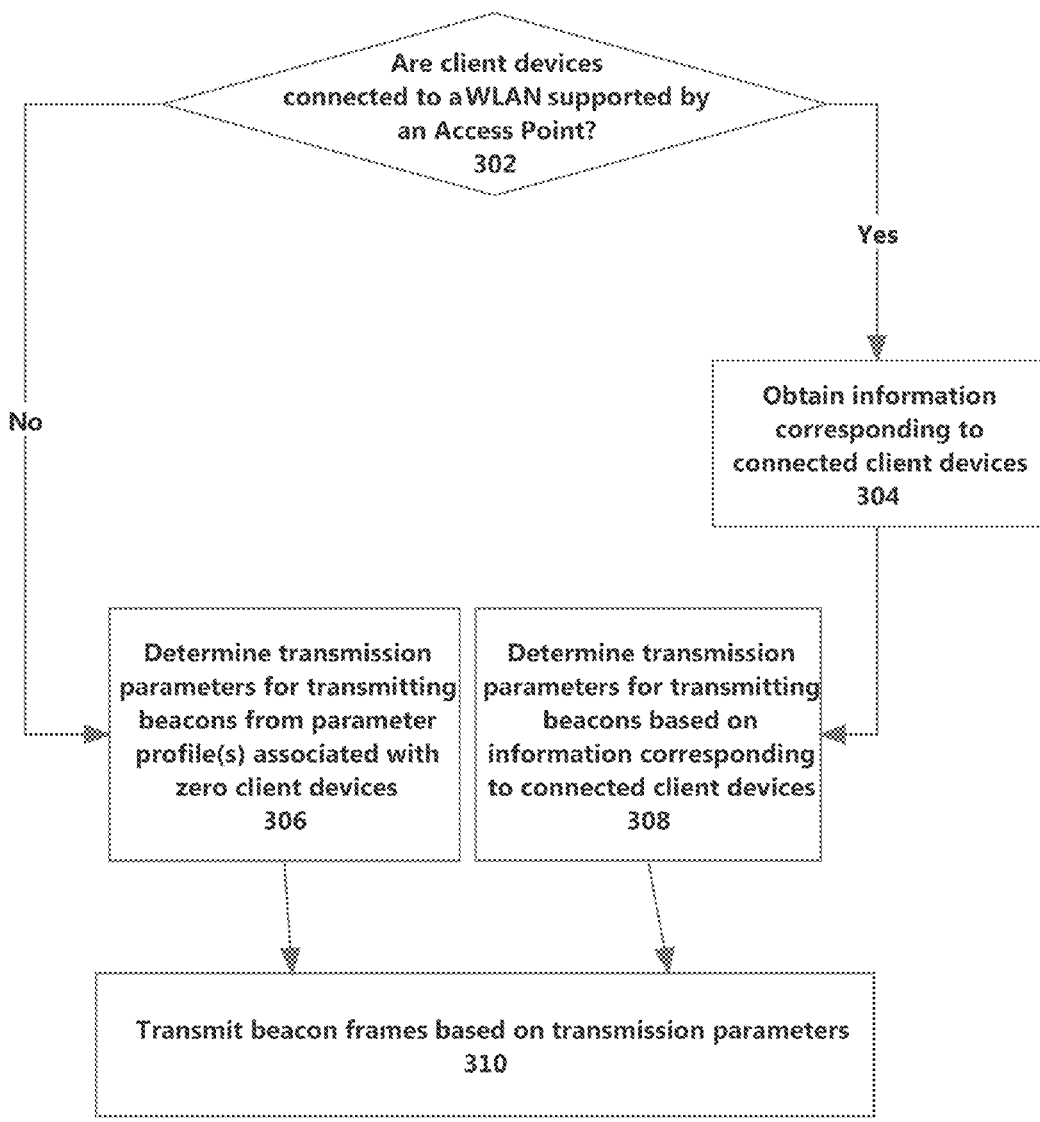
FIG. 3 illustrates an example method for determining transmission parameters for transmitting beacon frames related to a WLAN supported by an access point.

FIG. 3 illustrates an example method for determining transmission parameters for transmitting beacon frames related to a WLAN supported by an access point. One or more operations illustrated in FIG. 3 may be modified, rearranged, or omitted all together. Accordingly, the specific operations described herein should not be construed as limiting the scope of one or more embodiments.

One or more operations described below with reference to FIG. 3 may be performed periodically, continuously, in response to an event, or in accordance with another suitable technique. Examples of events include but are not limited to:
 a. Determining that the number of client devices connected to a WLAN supported by an access point has changed;
 b. Determining that the number of client devices connected to a WLAN supported by an access point has reached a threshold number.
 c. Determining that the number of client devices connected to a WLAN supported by an access point has changed from non-zero to zero;
 d. Determining that the number of client devices connected to a WLAN supported by an access point has changed from zero to non-zero;
 e. Detecting a change in a quality of connection between a client device and the access point;
 f. Determining that a client device connected to a WLAN supported by the access point has changed physical locations with respect to the access point;
 g. Determining that the amount of data stored in a buffer at an access point has reached a particular threshold (for example, a percentage capacity of buffer or an actual size of data stored in the buffer).

Initially, a determination is made whether client devices are connected to a WLAN supported by an access point in accordance with one or more embodiments (Step 302). The determination may be made by executing a query to identify client devices that are associated with the WLAN and authenticated by the access point (or by another device such as an authentication server). Determining that a client device is connected to a WLAN may also include determining that the client device has a currently active session with the access point via the WLAN.

In an embodiment, a determination that at least one client device is connected to the WLAN may be made in response to authorizing at least one client device that is associated with a WLAN supported by an access point or in response to another step involved in establishing a connection between a client device and a WLAN supported by an access point.

In an embodiment, each time an active session with a client device connected to a particular WLAN is terminated, a check may be performed to determine (1) if any client devices are still connected to the particular WLAN and/or (2) an actual number of client devices that are connected to the particular WLAN.

In an embodiment, information corresponding to client devices connected to a particular WLAN supported by an access point is obtained (Step 304). The information corresponding to client devices connected to a particular WLAN may include but is not limited to:
 a. An actual distance of a client device from an access point.
 b. An estimated distance of a client device from an access point.
 c. A data transmission rate used by the client device to transmit data frames to the access point.
 d. A data transmission rate for transmitting data frames to the client device from the access point.
 e. A data transmission rate for transmitting control or management frames to the client device from the access point.
 f. A highest data transmission rate that has been used for sending data frames to the client device or receiving data from the client device with an error rate (e.g., number of dropped packets) that is below an error rate threshold. This highest data transmission rate may be referred to herein as one of many suitable rates for sending data frames to the client device.
 g. An indication that no client devices are connected to a particular WLAN supported by an access point.
 h. A transmit power used by a client device to transmit data frames to an access point.
 i. A transmit power used by a client device to transmit management frames to an access point.

In an embodiment, the information corresponding to a client device is obtained via operations performed by an access point. In an example, an access point compares (i) a transmit power with which a signal(s) was transmitted by a client device with (ii) a signal strength at which that signal(s) was received by the access point to estimate a distance ("estimated distance") of the client device from the access point and/or a relative direction of the client device from the access point. In another example, an access point evaluates error rates (for example, packet drop rates) corresponding to communication at different data transmission rates between a client device and the access point. Based on the error rates corresponding to each data transmission rate, the access point selects the highest data transmission rate, provided its corresponding error rate is below an error rate threshold. In an example, the access point (or another device) computes a data transmission rate suitable for transmitting a management frame to a particular client device as a percentage (for example, fifty percent) of the data transmission rate used by the particular client device to transmit data frames to the access point.

In an embodiment, the information corresponding to a client device is received by the access point from that client device or from a different device. In an example, a data transmission rate suitable for transmitting management frames or data frames to a client device is received from that same client device as a preferred data transmission rate. In another example, the GPS coordinates, which indicate the location of the client device in a national park, are transmitted to an access point within the same national park.

For purposes of clarity, block 304 is illustrated in response to a test (operations referred to in Block 302) resulting in determining that one or more client devices are connected to a WLAN supported by an access point. However, operations referred to in Block 302 and Block 304 may be combined, for example, by executing a query to return information corresponding to client devices. If client devices are associated with the access point, then the information corresponding to connected client devices identifies the actual information. If client devices are not associated with the access point, then the information corresponding to connected client devices includes an indication that no client devices are associated with the access point.

The information corresponding to one or more client devices, connected to a particular WLAN, is used to determine transmission parameters for transmitting beacon frames associated with the particular WLAN (Step 308). When zero client devices are connected to a particular WLAN supported by access point, the transmission parameters for transmitting beacon frames for the particular WLAN may be determined using a parameter profile(s) associated with zero client devices (Step 306). The parameter profile associated with zero client devices is a set of parameter values for use when transmitting beacons frames for a particular WLAN when zero client devices are connected to that particular WLAN.

In an embodiment, the values of transmission parameters for transmitting beacon frames associated with a particular WLAN are dynamically modified based on the zero or more client devices that are currently connected to the particular WLAN. In an example, the transmission parameters are dynamically updated in response to one or more events described above.

In an example, two or more WLANs are supported by an access point. The transmission parameters used for transmitting beacon frames related to a first WLAN of the two or more WLANs supported by the access point, are determined based on information corresponding to client devices connected to the first WLAN. The transmission parameters used for transmitting beacon frames related to a second WLAN of the two or more WLANs are determined based on information corresponding to client devices connected to the second WLAN. Accordingly, different transmission parameters are used for transmitting beacon frames related to different WLANs supported by the same access point.

In an embodiment, transmission parameters for transmitting beacon frames may be updated dynamically. The transmission parameters may be updated continuously, periodically, or in response to particular events. The transmission parameters may be determined based on information associated with the zero or more client devices associated with a particular WLAN supported by an access point. The transmission parameters may be determined based on an amount of data stored at an access point, transmitted by an access point, and/or received by an access point.

5. EXAMPLES OF DETERMINING A BEACON INTERVAL FOR TRANSMITTING BEACON FRAMES

In one embodiment, a length of the beacon interval for transmitting beacon frames corresponding to a particular WLAN is inversely proportional to a number of client devices connected to the particular WLAN. Accordingly, a frequency with which the beacon frames are transmitted increases with the number of client devices connected to the particular WLAN.

When zero client devices are connected to a particular WLAN supported by an access point, the transmission of beacon frames for the particular WLAN may be reduced in frequency or altogether stopped (frequency set to zero, or beacon interval set to a very high value resulting in almost zero beacon frames sent per period of time). In an example, an access point in a restaurant supports multiple WLANs corresponding to different cellular carriers and advertises beacon frames for each supported WLAN. If the access point determines that no client devices are connected to a WLAN corresponding to a particular carrier, then the access points suspends transmission of beacon frames for that WLAN corresponding to the particular carrier until at least one client device connects to that WLAN. Alternatively, when zero client devices are connected to a particular WLAN, the access point reduces the frequency with which beacon frames for that particular WLAN are transmitted by, for example, increasing the beacon interval.

In an embodiment, determining the beacon interval for a particular WLAN is based at least in part on an amount of data buffered at an access point. In an example, when the utilization of channel at an access point reaches a particular threshold (for example, 80% of the capacity) and/or when the amount of data buffered at an access point reaches a particular threshold (for example, 90% of buffer capacity), then the amount of channel time allocated for sending beacon frames is reduced and the amount of channel time allocated for sending data frames is increased. To implement the change in allocation of channel time, the frequency of sending beacon frames is decreased and/or the data transmission rate for sending beacon frames is increased. Other factors may also be used for dynamically determining the beacon interval or frequency of sending beacon frames.

6. EXAMPLES OF DETERMINING A DATA TRANSMISSION RATE FOR TRANSMITTING BEACON FRAMES

In an embodiment, a data transmission rate for transmitting beacon frames for a particular WLAN is determined based on data transmission rates suitable for client devices connected to the particular WLAN.

In an example, an access point in a corporate environment transmits data to and/or receives data from client devices, connected to a particular WLAN, at various data transmission rates. The access point then determines a suitable data transmission rate for each client device by selecting the highest data transmission rate at which errors (for example, observed packet drop rate) were below an error threshold (for example, maximum packet drop rate). Suitable data transmission rates for each client device may also be the data transmission rates used by each client device to transmit data to the access point.

Based on the suitable data transmission rates for each client device connected to the particular WLAN, the access point selects a data transmission rate for transmitting beacon frames for that particular WLAN. The access point may select a data transmission rate for transmitting beacon frames for the particular WLAN based on the lowest data transmission rate of the suitable transmission rates determined for each client device.

In an example, the suitable data transmission rates for sending data frames from client devices to an access point are 10 megabits per second, 24 megabits per second, and 32 megabits per second. The access point determines that the lowest suitable data transmission rate is 10 megabits per second which was used by a first client device to transmit data frames to the access point. The access point then selects fifty percent of the suitable data transmission rate (50% of 10 megabits per second=5 megabits per second) as the data transmission rate for sending beacon frames for the particular WLAN. In another example, an average or mode of the suitable data transmission frames may be used to determine the data transmission rate for sending beacon frames for the particular WLAN.

In another example, the data transmission rate at which the beacon frame, for a particular WLAN supported by an access point, is transmitted by an access point is inversely proportional to an estimated distance or actual distance, of one or more client devices connected to the particular WLAN, from the access point.

In an embodiment, when zero client devices are connected to a particular WLAN, then the access point increases the data transmission rate for transmitting the beacon frames for that particular WLAN. Since the data transmission rate is increased, less channel time is used for transmitting the beacon frames.

7. EXTENSIONS, ALTERNATIVES, AND MISCELLANEOUS

In one or more embodiments, the above features and functionality, including determining transmission parameters for transmitting beacon frames for a particular WLAN, may be based on a set of client devices expected to be connected the particular WLAN. In one example, an access point within a concert hall may be configured based on an estimated number of client devices that will connect to the access point. The number of client devices that will connect to the access point during a particular concert may be estimated as a function (for example, twenty percent) of a number of tickets sold for the particular concert. In another example, historical data indicating suitable data transmission rates for client devices within a coffee shop from 7 am to 10 am daily is used to determine the data transmission rate for transmitting beacons from 7 am to 10 am. Accordingly, the dynamic adaption of transmission parameters for transmitting beacon frames may be based on historical data indicating patterns in client device connections and/or based on detected current client device connections.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
receiving, by an access point on a network, client device information associated with a client device connected to the network;
determining a transmission parameter for the client device based on an estimated amount of data traffic propagating through the access point, wherein the estimated amount is estimated based on previous knowledge of a metric of attendance for an event, an amount of data buffered at the access point relative to a threshold amount of capacity of the access point buffer, a transmission sent from the client device to the access point, and the client device information, wherein the determined transmission parameter for the client device facilitates generating and transmitting beacon frames associated with the network;
determining a distance between the access point and the client device utilizing one of a signal strength of a signal transmitted from the client device and an error rate for transmissions between the access point and the client device; and
transmitting the beacon frames at a transmission frequency according to the determined transmission parameter for the client device and at a data transmission rate that is inversely proportional to the determined distance between the access point and the client device, wherein the transmission frequency allots less time for sending a beacon frame and more time for sending a data frame in response to a determination that the amount of data buffered at the access point exceeds the threshold amount of capacity of an access buffer.

2. The method of claim 1, further comprising:
determining that no client devices are connected to the network through the access point;
suspending transmission of the beacon frames until a client device is detected to have connected to the network through the access point.

3. The method of claim 2, wherein determining that no client devices are connected to the network through the access point comprises determining that no client devices, other than client devices in a sleep mode or a suspended mode, are associated with the network through the access point.

4. The method of claim 2, wherein determining that no client devices are connected to the network through the access point comprises determining that no client devices have an active session for communication with the access point via the network.

5. The method of claim 1, further comprising:
transmitting the beacon frames at a transmission power according to the determined transmission parameter for the client device;
determining that no client devices are connected to the network through the access point; and
reducing the transmission power in response to determining that no client devices are connected to the network through the access point.

6. The method of claim 1, wherein transmitting the beacon frames at the data transmission rate further comprises reducing the data transmission rate in response to determining that no client devices are connected to the network through the access point.

7. The method of claim 1, further comprising:
  determining a number of client devices connected to the network;
  detecting an increase in the number of client devices connected to the network; and
  increasing the transmission frequency at which the beacon frames are transmitted in response to detecting the increase in the number of client devices connected to the network.

8. A computing device, comprising:
  one or more processors; and
  a memory having instructions stored thereon, which when executed by the one or more processors, cause the one or more processors to:
  receive, by an access point on a network, client device information associated with a client device connected to the network;
  determine a transmission parameter for the client device based on an estimated amount of data traffic propagating through the access point, wherein the estimated amount is estimated based on previous knowledge of a metric of attendance for an event, an amount of data buffered at the access point relative to a threshold amount of capacity of the access point buffer, a transmission sent from the client device to the access point, and the client device information, wherein the determined transmission parameter for the client device facilitates generating and transmitting beacon frames associated with the network;
  utilize one of a signal strength of a signal transmitted from the client device and an error rate for transmissions between the access point and the client device to determine a distance between the access point and the client device; and
  transmit the beacon frames at a transmission frequency according to the determined transmission parameter for the client device and at a data transmission rate that is inversely proportional to the determined distance between the access point and the client device, wherein the transmission frequency allots less time for sending a beacon frame and more time for sending a data frame in response to a determination that the amount of data buffered at the access point exceeds the threshold amount of capacity of an access buffer.

9. The computing device of claim 8, wherein the instructions are further to cause the one or more processors to:
  determine that no client devices are connected to the network through the access point; and
  suspend transmission of the beacon frames until a client device is detected to have connected to the network through the access point.

10. The computing device of claim 9, wherein to determine that no client devices are connected to the network through the access point, the instructions are further to cause the one or more processors to determine that no client devices, other than client devices in a sleep mode or a suspended mode, are associated with the network through the access point.

11. The computing device of claim 9, wherein to determine that no client devices are connected to the network through the access point, the instructions are further to cause the one or more processors to determine that no client devices have an active session for communication with the access point via the network.

12. The computing device of claim 8, wherein the instructions are further to cause the one or more processors to:
  transmit beacon frames-at a transmission power according to the determined transmission parameter for the client device;
  determine that no client devices are connected to the network through the access point; and
  reduce the transmission power in response to a determination that no client devices are connected to the network through the access point.

13. The computing device of claim 8, wherein the instructions are further to cause the one or more processors to reduce the data transmission rate in response to a determination that no client devices are connected to the network through the access point.

14. The computing device of claim 8, wherein the instructions are further to cause the one or more processors to:
  determine a number of client devices connected to the network;
  detect an increase in the number of client devices connected to the network; and
  increase the transmission frequency at which the beacon frames are transmitted in response to detecting the increase in the number of client devices connected to the network.

15. A non-transitory machine-readable storage medium on which is stored instructions that when executed by a data processing apparatus, cause a data processing apparatus to:
  receive, by an access point on a network, client device information associated with a client device connected to the network;
  determine a transmission parameter for the client device based on an estimated amount of data traffic propagating through the access point, wherein the estimated amount is estimated based on previous knowledge of a metric of attendance for an event, an amount of data buffered at the access point relative to a threshold amount of capacity of the access point buffer, a transmission sent from the client device to the access point, and the client device information, wherein the determined transmission parameter for the client device facilitates generating and transmitting beacon frames associated with the network;
  utilize one of a signal strength of a signal transmitted from the client device and an error rate for transmissions between the access point and the client device to determine a distance between the access point and the client device; and
  transmit the beacon frames at a transmission frequency according to the determined transmission parameter for the client device and at a data transmission rate that is inversely proportional to the determined distance between the access point and the client device, wherein the transmission frequency allots less time for sending a beacon frame and more time for sending a data frame in response to a determination that the amount of data buffered at the access point exceeds the threshold amount of capacity of an access buffer.

16. The non-transitory machine-readable storage medium of claim 15, wherein the instructions are further to cause the data processing apparatus to:
  determine that no client devices are connected to the network through the access point; and
  suspend transmission of the beacon frames until a client device is detected to have connected to the network through the access point.

17. The non-transitory machine-readable storage medium of claim 15, wherein to determine that no client devices are connected to the network through the access point, the instructions are further to cause the data processing apparatus to determine that no client devices, other than client devices in a sleep mode or a suspended mode, are associated with the network through the access point.

18. The non-transitory machine-readable storage medium of claim 15, wherein to determine that no client devices are connected to the network through the access point, the instructions are further to cause the data processing apparatus to determine that no client devices have an active session for communication with the access point via the network.

19. The non-transitory machine-readable storage medium of claim 15, wherein the instructions are further to cause the data processing apparatus to:

transmit the beacon frames at a transmission power according to the determined transmission parameter for the client device;

determine that no client devices are connected to the network through the access point; and reduce the transmission power in response to a determination that no client devices are connected to the network through the access point.

20. The non-transitory machine-readable storage medium of claim 15, wherein the instructions are further to cause the data processing apparatus to reduce the data transmission rate in response to determining that no client devices are connected to the network through the access point.

21. The non-transitory machine-readable storage medium of claim 15, wherein the instructions are further to cause the data processing apparatus to:

determine a number of client devices connected to the network;

detect an increase in the number of client devices connected to the network; and increase the transmission frequency at which the beacon frames are transmitted in response to detecting the increase in the number of client devices connected to the network.

* * * * *